United States Patent
Mildh et al.

(10) Patent No.: US 10,341,894 B2
(45) Date of Patent: Jul. 2, 2019

(54) RELIABILITY MONITORING FOR CRITICAL WIRELESS SERVICES

(71) Applicant: Telefonaktiebolaget LM Ericsson (publ), Stockholm (SE)

(72) Inventors: Gunnar Mildh, Sollentuna (SE); Joakim Axmon, Malmö (SE); Martin Hessler, Linköping (SE); Eleftherios Karipidis, Stockholm (SE); Torgny Palenius, Barsebäck (SE); Joachim Sachs, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 15/522,048

(22) PCT Filed: Dec. 22, 2016

(86) PCT No.: PCT/SE2016/051315
§ 371 (c)(1),
(2) Date: Apr. 26, 2017

(87) PCT Pub. No.: WO2018/117923
PCT Pub. Date: Jun. 28, 2018

(65) Prior Publication Data
US 2018/0288641 A1    Oct. 4, 2018

(51) Int. Cl.
*H04L 12/28* (2006.01)
*H04W 24/10* (2009.01)
(Continued)

(52) U.S. Cl.
CPC .......... *H04W 24/10* (2013.01); *H04B 17/336* (2015.01); *H04W 4/023* (2013.01)

(58) Field of Classification Search
CPC ..................................................... H04W 24/10
(Continued)

(56) References Cited

U.S. PATENT DOCUMENTS

| 2012/0046026 A1 | 2/2012 | Chande et al. |
| 2012/0083280 A1 | 4/2012 | Liu et al. |

(Continued)

OTHER PUBLICATIONS

3GPP, "3rd Generation Partnership Project; Technical Specification Group Services and System Aspects; Feasibility Study on New Services and Markets Technology Enablers for Critical Communications; Stage 1 (Release 14)", 3GPP TR 22.862 V14.1.0 (Sep. 2016), Sep. 2016, 1-31.

(Continued)

*Primary Examiner* — John Pezzlo
(74) *Attorney, Agent, or Firm* — Murphy, Bilak & Homiller, PLLC

(57) ABSTRACT

Techniques, such as might be implemented in a wireless device operating in a wireless network, for reporting measurements of interference affecting a wireless service provided by the wireless network. An example method includes receiving (210), from the wireless network, configuration information instructing the wireless device to perform measurements on one or more radio resources or signals, where the one or more radio resources or signals are solely associated with one or more wireless services that the wireless device is at least currently unable to use. The method further includes performing (220) one or more measurements on the radio resources or signals, in accordance with the received configuration information, and selectively reporting (230) results of the measurements, based on the configuration information.

35 Claims, 6 Drawing Sheets

(51) Int. Cl.
*H04B 17/336* (2015.01)
*H04W 4/02* (2018.01)
*H04J 1/16* (2006.01)

(58) Field of Classification Search
USPC .................................. 370/252, 278, 329, 430
See application file for complete search history.

(56) References Cited

U.S. PATENT DOCUMENTS

| | | | |
|---|---|---|---|
| 2012/0096513 A1* | 4/2012 | Raleigh | H04L 12/1403 726/1 |
| 2015/0117238 A1 | 4/2015 | Kronestedt et al. | |
| 2016/0192279 A1* | 6/2016 | Jorguseski | H04W 48/20 455/434 |

OTHER PUBLICATIONS

Unknown, Author, "Scheduling and CQI feedback for URLLC", Fujitsu, 3GPP TSG RAN WG1 Meeting #87, R1-1611466, Reno, USA, Nov. 14-18, 2016, 1-5.

\* cited by examiner

RELIABILITY MONITORING FOR CRITICAL WIRELESS SERVICES

TECHNICAL FIELD

The present disclosure is generally related to wireless communication networks and is more particularly related to techniques for reporting and using measurements of interference affecting critical wireless services provided by a wireless network.

BACKGROUND

The 3rd-Generation Partnership Project (3GPP) is currently developing specifications for a so-called fifth-generation (5G) cellular wireless communications system. A category of usage scenarios referred to by 3GPP as "Ultra-Reliable and Low Latency Communications" or "URLLC" is a family of usage scenarios identified by 3GPP to be addressed by future 5G cellular systems. A 3GPP document numbered 3GPP TR 22.862, v14.1.0, and titled "Feasibility Study on New Services and Markets Technology Enablers for Critical Communications," defines URRLC as comprising use cases that are characterized by higher reliability, higher availability, and lower latency requirements, compared to conventional services.

Example of such use cases could include:

Remote control of machinery by a human operator located at a different place. This could, for instance, be used in the forest, mining, transportation industry, such that the use of remote control enables placing human operators at a safe, cost-efficient place that is different from the remote machine. In this scenario, the operator requires a highly reliable communication link to the controlled machine, which may carry control information, audio, video, haptic feedback, etc.

Intelligent traffic systems, to improve traffic safety and efficiency. This scenario can include cars, buses, and trucks that communicate with each other as well as with surrounding roadside equipment, pedestrians, etc. One example of such a use case is truck platooning, where trucks can lower fuel consumption by traveling very closely to each other. This requires a highly reliable and low-latency communication channel between the trucks, e.g., to coordinate braking.

Industrial factory automation, making it possible to improve factory efficiencies by connecting all sensors and actuators to the same network, enabling centralized control. Wireless technologies can play a large part in this, since wireless communications minimizes the need to deploy cables, which may be costly to maintain. Depending on the scenario or the particular control loop, the communications for factory automation could require very low latency and/or high reliability could be very high.

High reliability is one of the most important aspects of URLLC use cases. As can be seen in 3GPP TR 22.862, not all use cases in this family require latencies as low as 1 millisecond, but instead what is most important is that the messages get reliably delivered within a given latency bound. Reliability in this sense can be defined such that the ratio of lost, erroneous or delayed messages (i.e., exceeding the given latency bound) should be very low. If, for example, transmission of messages is required to be provided at a reliability level of $1-10^{-5}$, within a delay bound of 1 millisecond, then only $10^{-5}$ of the transmissions may either fail, or lead to latencies exceeding the 1 ms bound. In other words, for a URLLC service, the successful in-time transmission of messages needs to be guaranteed for the service up to the given reliability level for the defined latency bound.

This is illustrated in FIG. 1, which shows an example cumulative distribution function (CDF) indicating the percentage of transmissions delivered within a given latency. As shown in the figure, at least $(100-\varepsilon)\%$ of the transmissions should be delivered within the latency bound, where $\varepsilon$ defines a maximum failure level for the corresponding service, in percentage terms, and thus $100-\varepsilon$ defines the minimum reliability level.

Another characteristic that is important for some URLLC use cases is high availability of the service. High availability is related to the end-to-end availability of an adequate communication path between the applications of the communication endpoints. The availability is specific to a service (or a class of services). For example, the availability provided by a specific network deployment and configuration for low-rate services with required high reliability but modest latency may differ from the availability provided to high-rate services with modest reliability and very low latency. Furthermore, the availability of services needs to be considered within the area of interest for a certain service. For example, for industrial factory automation, availability may be relevant only within the factory area, whereas for remote control of vehicles a much larger geographic area is relevant concerning the availability.

The communication path between the communication end points will be made up of radio links as well as transport links and different hardware and software-implemented functions. These resources may be deployed using redundant components and links, thus providing high availability. The provision of high availability is very much up to the operator offering the URLLC service.

Low latency is another service characteristic frequently mentioned in relation to URLLC, in 3GPP TR 22.862. For future 5G cellular networks, target latencies for URLLC are 0.5 milliseconds for both uplink and downlink communications. It is important to note though that many URLLC use cases may not require such low latency, and/or may require low latency in only one direction. Thus, 3GPP TR 22.862 describes use cases ranging from those that require 1-millisecond end-to-end latencies to others that are satisfied with multi-second latencies. Many URLLC services are most interested in the latency bound, i.e., the largest message latency that is expected to be achieved with a high reliability, as discussed above and in connection with FIG. 1. Transmission with lower latency than the bounded latency may not provide any benefits for these services. Generally, it is expected that there will be a trade-off between reliability and latency, e.g., a system may be able to provide 0.5-millisecond latency with a relatively low reliability, while much higher reliability is achieved (e.g., thanks to re-transmissions) if the latency can be longer.

It is difficult for a cellular operator to provide high-reliability services in wireless networks due to such factors as mobility of the wireless devices (referred to as "user equipment" or "UEs," in 3GPP documentation), varying signal coverage, congestion, variable system loading, interference. In an indoor controlled environment, such as a factory, it may be possible with traditional planning methods to provide a high-reliability service, but for wide-area coverage more statistically based methods are required. Most wireless network deployments are not controlled environments, in that they are affected by a number of external factors that are not readily controlled by either the wireless operator or the customer.

SUMMARY

According to various embodiments of the presently disclosed systems, methods, and devices, the reliability of a service is monitored and managed by configuring wireless devices that are not using or participating in the service to monitor the radio condition of the service. In other words, multiple wireless devices are enabled to monitor and report data relevant to a critical service, such as measurements related to a URLLC service, even if the wireless devices themselves do not use the critical service. This will generate more reports and statistics, making it easier for a control function to detect rare problems with providing high-reliability services. In some cases, the devices utilized may be actively using other wireless services anyway, so the additional cost of reporting the quality of critical services is low. Further, these other devices may be equipped with additional types of connectivity and or services, relative to devices that utilize the critical service, such that they are better able to detect and report reliability problems than the devices utilizing the critical service.

An example method according to some embodiments of the presently disclosed techniques is carried out in a wireless device operating in a wireless network, and is for reporting measurements of interference affecting a wireless service provided by the wireless network. The example method includes receiving, from the wireless network, configuration information instructing the wireless device to perform measurements on one or more radio resources or signals, where the one or more radio resources or signals are solely associated with one or more wireless services that the wireless device is at least currently unable to use. The method continues with performing one or more measurements on the radio resources or signals, in accordance with the received configuration information. The method further includes selectively reporting results of the measurements, based on the configuration information.

Another example method according to some embodiments of the presently disclosed techniques is carried out in one or more nodes operating in or associated with a wireless network providing a critical wireless service, in addition to one or more other wireless services. This example method includes receiving, from one or more wireless devices at least currently unable to use the critical wireless service, results of measurements performed on one or more radio resources or signals associated with the critical service. This method further includes taking at least one action to adjust delivery or operation of the critical wireless service, based on the received results of measurements.

Other embodiments disclosed herein include apparatuses adapted to carry out one or more of the techniques summarized above and detailed below. An example wireless device, for example, is adapted to receive, from the wireless network, configuration information instructing the wireless device to perform measurements on one or more radio resources or signals, where the one or more radio resources or signals are solely associated with one or more wireless services that the wireless device is at least currently unable to use. The wireless device is further adapted to perform one or more measurements on the radio resources or signals, in accordance with the received configuration information, and to selectively report results of the measurements, based on the configuration information. The wireless device may comprise a radio transceiver and a processing circuit operatively coupled to the radio transceiver and configured to carry out one or more of the methods summarized.

An example node or arrangement of one or more nodes is adapted for operation in or in or associated with a wireless network providing a critical wireless service, in addition to one or more other wireless services. The one or more nodes are adapted to receive, from one or more wireless devices at least currently unable to use the critical wireless service, results of measurements performed on one or more radio resources or signals associated with the critical service, and to take at least one action to adjust operation or delivery of the critical wireless service, based on the received results of measurements.

Other embodiments include computer program products comprising program instructions for carrying out one or more of the methods summarized above and/or detailed below, and corresponding computer-readable media.

The methods, devices, and systems described herein may be used to provide one or more of the following advantages, in various embodiments.

- The network will know if and where there is problem offering reliable services. Actions can be taken to fix the problem.
- The network knows what level of reliability it can offer in a given area. With this information, the network can decide on whether or by how much to over-dimension a service, e.g., by adjusting a power margin for the service. Similarly, with this information, the network can know what level of reliability it can offer to end users. In some cases, end users' applications can adapt their modes of operation to this level of reliability, to optimize application performance.
- The devices that are running reliable services can be made simpler and more secure if they do not themselves need to have functionality for monitoring and reporting certain radio measurements needed to enable the reliable service.

Details of the embodiments summarized above and further embodiments will be apparent from the following detailed description of embodiments.

DETAILED DESCRIPTION

Figure 1:
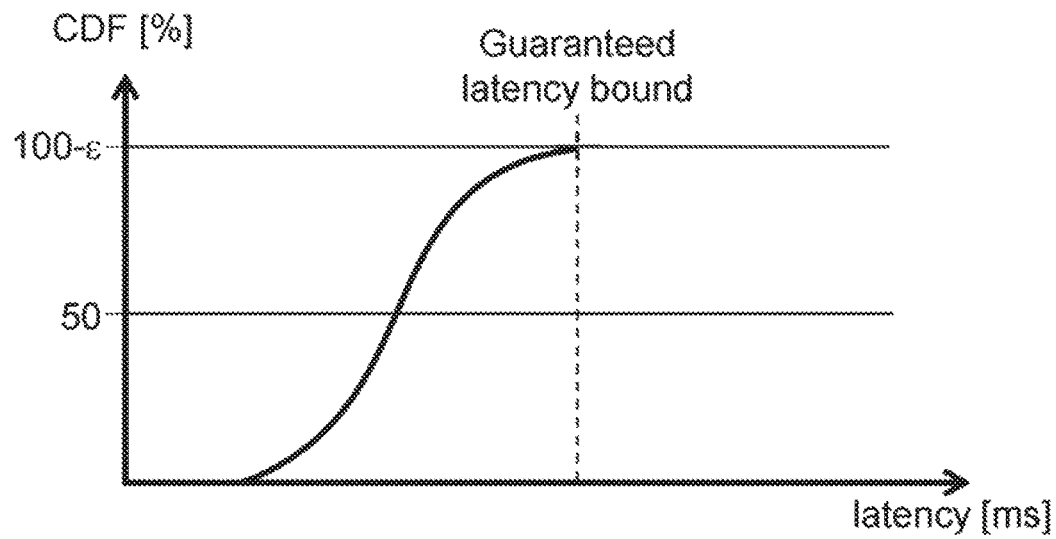
FIG. 1 illustrates an example of reliability in relation to latency, where latencies are guaranteed for a service up to a specified reliability level.

In the following, concepts in accordance with exemplary embodiments of the invention will be explained in more detail and with reference to the accompanying drawings. The illustrated embodiments relate to control of access to a wireless communication network by radio devices, in the following also referred to as UEs. The wireless communication network may for example be based on a 5G radio access technology (RAT), such as an evolution of the LTE RAT or the 3GPP New Radio (NR). However, it is to be understood that the illustrated concepts could also be applied to other RATs.

Embodiments of the presently disclosed techniques may be described herein in relation to "wireless devices." As used herein, "wireless device" refers to a device capable, configured, arranged and/or operable to communicate wirelessly with network equipment and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The wireless device may support device-to-device (D2D) communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network equipment. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As used herein, the term "network node" or, simply "node," refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. Network nodes may represent base stations (BSs), such as radio base stations. Particular examples of radio base stations include Node Bs, and evolved Node Bs (eNBs). Base stations may be categorized based on the amount of coverage they provide (or, stated differently, based on their transmit power levels) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multistandard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes may represent any suitable device (or group of devices) capable, configured, arranged, and/or operable to enable and/or provide a wireless device access to the wireless communication network or to provide some service to a wireless device that has accessed the wireless communication network.

High-reliability services, by their very nature, generate very few lost, late, or erroneous messages. As a result, building accurate statistics based on such few errors takes a very long time. This means that it can be difficult to detect changing conditions quickly enough, such that when an error is first detected the damage to the system's performance may already be done, such that corrective measures cannot be taken quickly enough to maintain the target reliability for the system or service. Further, in some cases, the devices that are running the reliable service may be prohibited from reporting a reliability problem, either due to the problem itself or due to limited functionality of the devices. This means that it may be difficult for a control function in the network to quickly obtain sufficient information to detect potential or actual problems with service reliability.

As briefly discussed above, according to the presently disclosed techniques, multiple wireless devices are enabled to monitor and report data relevant to a critical service, such as measurements related to signals corresponding to a URLLC service, even if the wireless devices are "non-participating," in that these devices do not or cannot use the critical service. This will generate more reports and statistics for a control function, which may be at any of various places in the network, making it easier for the control function to detect rare problems with providing high-reliability services. According to some embodiments, for example, non-participating wireless devices, or "UEs," in 3GPP terminology, could measure some pilot signals or reference signals that are associated with an ultra-reliable service, where these pilot signals or reference signals would not normally be monitored by a wireless device that is not using the service. Similarly, the UEs could, in some embodiments, decode some beacons/messages that are related to the ultra-reliable service and that are unnecessary for devices that are not using the service.

These measurements and/or the results of the decoding can be reported to the network, for collection and analysis by a control function associated with the ultra-reliable service, which can then adapt the service (e.g., by adjusting power margins) based on these measurements. Measurement reports from these monitoring but non-participating wireless devices can include quality information, and the measurement can be periodic or event-triggered, in various embodiments. In some embodiments, the non-participating wireless devices receive instructions from the network on what to look for. Events might be triggered, for example, when a non-participating UE is unable to decode a signal that is associated, e.g., solely associated, with a critical service that is not used by the UE.

The non-participating UE may report measurements, events, decoding failures, etc., to the network, using, for example, a beacon signal or message that the network decodes. This reporting and any control functions responsive to the reporting can be implemented at any of several levels, e.g., at the level of the Radio Access Network (RAN), at the level of the Core Network (CN), or at a so-called over-the-top (OTT) level, where the implementation is at least partly at a server outside the core network.

In some embodiments, for example a critical service may rely on the interference to one or more signals being kept at a sufficiently low level. Example services are industrial automation, home alarm installations, public safety spectrum. In these embodiments, a second non-participating wireless device can be configured with an interference measurement resource on the relevant spectrum, so that it monitors for interference and reports if the measured signal level is above threshold. This non-participating wireless device may, in some cases, be unable to use the critical service at issue, e.g., because of hardware or software limitations, or because it lacks some configuration parameters necessary to use the service, or even simply because it has not been activated to use the service. The monitored resource can be any of various types. In some embodiments, the interference measurement resource is blanked resource, in some embodiments it is a (known) reference signal, and in some embodiments it is a combination of a reference signal and a blanked resource.

In some scenarios, the devices using the critical service can themselves not react to the interference situation, for example because of un-controlled WiFi devices or other jamming transmitters. In some embodiments, the devices using the critical service are configured with a limited service either due to that the radio resource assignment is limited or semi-static for the service or because the critical service is running without external connectivity. For example, an industrial automation implementation may not equip all sensors and attenuators with extra resources. Another example is a nuclear plant, where many safety functionality devices should not be equipped with any external connectivity for security reasons. In some embodiments, the detected interference prohibits reporting, e.g., a jamming device for an alarm system prohibits the alarm system from reporting said jamming. In this scenario, a second device using a second frequency band and/or at a larger distance from said jamming device can report said jamming.

In some embodiments, the sensor and actuator locations are known at least to within some perimeter (e.g., from factory floor plan, etc.), and the second set of devices providing reporting on interference situation are additionally reporting the positions at which said interference measurements have been carried out. The node that monitors the interference takes into account the position of the sensors, as well as the positions at which interference measurements have been carried out, and determines whether the reported interference poses a risk for the high reliability communication with the sensors or actuators. In these and in various other embodiments, the node that collects the reports can take any of several actions to mitigate or otherwise respond to the interference, such as rescheduling traffic, increasing transmission power, informing a user or customer of the interference, or commanding changes to the physical operation, such as increasing the separation between automobiles in an automotive application or otherwise increasing safety margins in automated processes.

Another scenario is in an industrial automation environment, where the critical service is running on devices that are mobile. In such embodiments, the devices reporting interference and jamming can identify an area where the interference is high. With this information, the system knows that the service performance will be degraded when a device with critical services is entering this area, and the system can take appropriate action even before the participating device detects that that the interference increases.

In some embodiments, UEs that support interference and radio jamming reporting may provide information thereof to a network node through capability reporting. This capability reporting may, for instance, comprise explicit information indicating that the device is capable of one or more such measurements, or implicit information that is linked to the device's reporting that it supports a particular UE category.

Capabilities may for instance include determining one or more of the metrics:
  SINR measurements or other signal quality measurements carried out on pilot and synchronization signals, and/or broadcasted channels.
  Decoding performance of broadcasted channels
  RSSI
  Pilot or sync signal received power
  Broadcasted channel received power A UE may be configured to report interference and jammer status periodically (using configurable periodicity), or when an event has occurred. In case of event triggered reporting, the event may for instance be that a certain metric (e.g., SNR) goes outside a particular range which can be provided by the network node either as a UE-specific configuration or as a common configuration. In some embodiments, for example, the UE reports that a measured SNR is worse, i.e., lower, than a predetermined or configured threshold. In other embodiments, the UE may report that a jamming signal, e.g., as observed in a time-frequency resource that is supposed to be "blank," is higher than a predetermined or configured threshold level. In some embodiments, the absence of an expected signal may be reported. In some embodiments, the event may also comprise a combination of metrics (e.g., a first metric going below/above one threshold and/or a second metric going below/above one threshold, etc.). A hysteresis may be applied, in some embodiments, to prevent excessive reporting back and forth between good and bad conditions. The hysteresis may be signaled explicitly together with one threshold per metric, or may be signaled as a pair of thresholds (going out of range, going in range).

The UE may further be configured to report the interference and jamming status per one or several subbands, e.g., for the case that the URLLC devices use only a fraction of the total system bandwidth.

The reports may be sent to the network using RRC protocol or any other protocol, including reports sent in the user plane, e.g., on top of IP as any application signaling.

In various embodiments, the UE may report the interference and jamming status with a report that includes any of the following:
- configured metrics, i.e., reporting specific parameters, measurements, or the like, as instructed by a control function in the node or as according to a pre-configuration of the UE;
- one or more metrics per subband (or metrics for unfavorable subbands)
- positioning information, such as Global Navigation Satellite System (GNSS) information, or fingerprint information, such as serving cell, approximate distance to a particular emitter, neighbor cells, etc.

According to various embodiments, a node may, upon receiving interference and jamming reports, assess whether interference and jamming may pose a threat to the URLLC communication, and to take appropriate action, e.g., by adjusting the operation of the critical service. This functionality is referred to herein as a control function, and may be hosted, in whole or in part, in a RAN node, a CN node, or in a node outside the wireless network. The assessment may be based on several UE reports from different locations, in some embodiments and/or scenarios, in which case the network node may interpolate and extrapolate to find the likely location of the jammer, and may thereafter assess whether actions should be taken to secure the URLLC communication links. As discussed above, the control function may take any of several actions to mitigate or otherwise respond to the interference, such as rescheduling traffic, increasing transmission power, informing a user or customer of the interference, or commanding changes to the physical operation, such as increasing the separation between automobiles in an automotive application or otherwise increasing safety margins in automated processes.

In some embodiments, the node hosting the control function may additionally determine whether certain subbands are impacted by a jammer, and may take this into account when allocating or scheduling the URLLC devices, or when taking other actions related to the critical service. When the node determines which subbands are unsuitable for allocation it may do so based on the location at which a UE has provided an interference and jammer report. URLLC devices that are foreseen to be impacted are then scheduled in other subbands and/or using a more robust encoding.

The network, via the node providing the control function or under the control of such a node, for example, can provide several features enabling the UEs to perform measurement on coverage, interference and jamming of critical services. The network can transmit reference signals, beacons, or other signal on resources used for critical services or alternative resources which have similar properties. The transmission can be periodic or triggered by certain events, for example. The network can order/configure UEs to perform measurements for these signals. The configuration can be valid for a certain period for periodic or continuous measurements or for "single shot" measurements. The configuration can be sent to specific mobiles or all mobiles within service areas (e.g., the whole network, or a specific region, city, site, etc.). In some embodiments, the network can blank its own transmissions (of other service) according to a suitable pattern, to enable measurements without self-interference on resources used for critical services.

Figure 2:
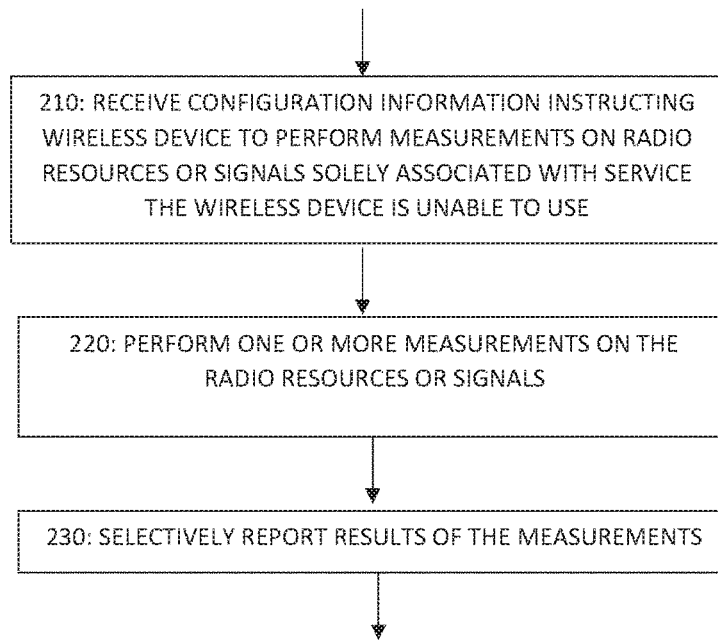
FIG. 2 is a process flow diagram illustrating an example method implemented in a wireless device.

In view of the description and detailed examples given above, it will be appreciated that FIG. 2 illustrates a generalized method according to the presently disclosed techniques, as might be implemented in a wireless device operating in a wireless network, for reporting measurements of interference affecting a wireless service provided by the wireless network. As shown at block 210, the illustrated method includes receiving, from the wireless network, configuration information instructing the wireless device to perform measurements on one or more radio resources or signals, where the one or more radio resources or signals are solely associated with one or more wireless services that the wireless device is at least currently unable to use. The method continues, as shown at block 220, with performing one or more measurements on the radio resources or signals, in accordance with the received configuration information. As shown at block 230, the method further includes selectively reporting results of the measurements, based on the configuration information.

In some embodiments, the one or more wireless services that the wireless device is at least currently unable to use comprises a service having at least one of the following: one or more higher reliability requirements than corresponding reliability requirements for a generic data service also provided by the wireless network; one or more higher availability requirements than corresponding availability requirements for a generic data service also provided by the wireless network; and one or more lower latency requirements than corresponding latency requirements for a generic data service also provided by the wireless network. The service may correspond to a URLLC use case, for example, as described in 3GPP specifications.

In various embodiments, the wireless device is at least currently unable to use the one or more wireless services because of at least one of the following: the wireless device is physically incapable of using at least one of the one or more wireless services; the wireless device is not equipped with one or more software or firmware components needed to carry out at least one of the more wireless services; the wireless device is not configured with parameters necessary for using at least one of the one or more wireless services; and at least one of the one or more wireless services is not activated on the wireless device.

In some embodiments, performing measurements on the radio resources or signals comprises performing a signal-to-noise ratio (SNR) or signal-to-interference-plus-noise (SINR) measurement, where selectively reporting results of the measurements comprises reporting a result of the SNR or SINR measurement in response to the SNR or SNR measurement being lower than a threshold value. In some embodiments, the method may further or instead comprise determining that a signal is not detected, based on performing the one or more measurements, and reporting an indication that the signal is not detected.

In some embodiments, selectively reporting results of the measurements comprises reporting separate results for each of two or more frequency subbands. In some embodiments, selectively reporting results of the measurements comprises reporting positioning information corresponding to the reported results. This positioning information may comprise information received from or derived from received global navigation satellite system (GLASS) signals, for example, such as signals from Global Positioning System (GPS) satellites. In some embodiments, the positioning information may instead or additionally include one or more of the following: a serving cell identifier for the wireless device; an estimated distance of the wireless device from a transmitter; and identifiers for one or more neighboring cells.

Figure 3:
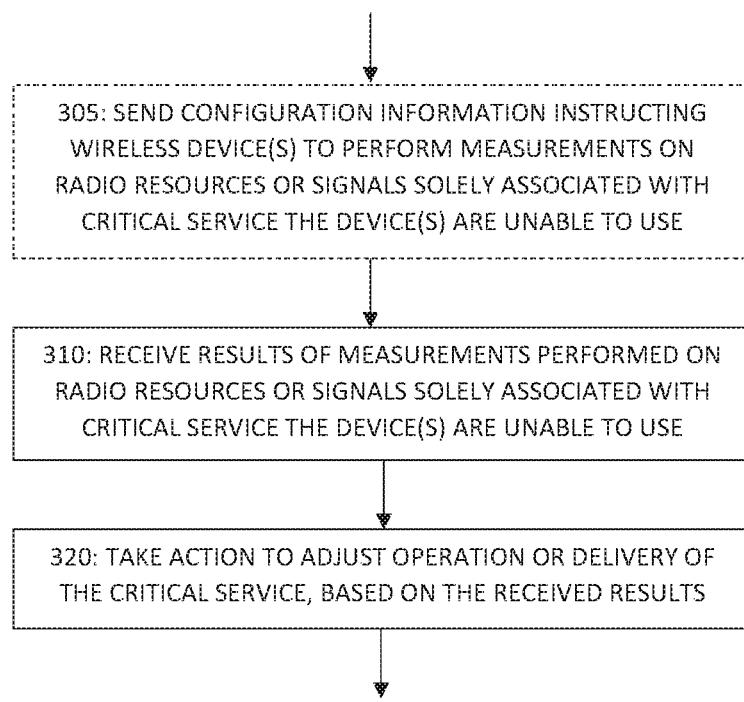
FIG. 3 is a process flow diagram illustrating an example method implemented in node operating in or associated with a wireless network.

FIG. 3 illustrates another example method according to the techniques described herein, as might be implemented in one or more nodes operating in or associated with a wireless network providing a critical wireless service, in addition to one or more other wireless services. It will be appreciated that the method shown in FIG. 3 complements the method of FIG. 2, as discussed in more detail below.

As shown at block 310, the method of FIG. 3 includes receiving, from one or more wireless devices at least currently unable to use the critical wireless service, results of measurements performed on one or more radio resources or signals associated with the critical service. This step corresponds to the reporting step shown in block 230 of FIG. 2, where a wireless device selectively reports, to the network, the results of measurements. As shown at block 320, the method further includes taking at least one action to adjust delivery or operation of the critical wireless service, based on the received results of measurements.

As used herein, the term "critical wireless service" refers to a service that has as at least one of the following: one or more higher reliability requirements than corresponding reliability requirements for a generic data service also provided by the wireless network; one or more higher availability requirements than corresponding availability requirements for a generic data service also provided by the wireless network; and one or more lower latency requirements than corresponding latency requirements for a generic data service also provided by the wireless network. Again, the critical service may correspond to one of the URLLC use cases described in 3GPP specifications, in some embodiments. As was the case with the methods discussed above, in some embodiments the one or more wireless devices are at least currently unable to use the critical wireless service because of at least one of the following: one or more of the wireless devices is physically incapable of using the critical wireless service; one or more of the wireless devices is not equipped with one or more software or firmware components needed to carry out the critical wireless service; one or more of the wireless devices is not configured with parameters necessary for using the critical wireless service; and the critical wireless service is not activated on one or more of the wireless device.

In some embodiments, the taking at least one action comprises scheduling transmissions related to the critical wireless service, based on the received results of measurements. In some of these embodiments, the received results of measurements comprise separate results for each of two or more frequency subbands, and the scheduling of transmissions related to the critical wireless service comprises selecting a frequency subband for scheduling a transmission related to the critical wireless service, based on the separate results for each of two or more frequency subbands. In some embodiments, the taking at least one action instead or additionally comprises adjusting a power of at least one transmission related to the critical wireless service, based on the received results of measurements.

In some embodiments, the received results of measurements comprise positioning information for the corresponding measurements. In some of these embodiments, taking at least one action to adjust operation or delivery of the critical wireless service is based on the positioning information.

In some embodiments, the operations shown at blocks 310 and 320 may be preceded by sending, to one or more wireless devices, configuration information instructing the wireless devices to perform measurements on the one or more radio resources or signals. This is shown at block 305, which is illustrated with a dashed outline to indicate that it need not be present in every implementation or instance of the method shown in FIG. 3. The configuration step shown in block 305 corresponds to the step shown in block 210 of FIG. 2, where a wireless device receives configuration information from instructing the wireless device to perform these measurements. In some cases, however, the reporting wireless devices may be pre-configured with necessary information and/or instructions for monitoring and reporting, in which case the step shown in block 305 may not be present. In others, a separate node may send any such configuration information.

Figure 4:
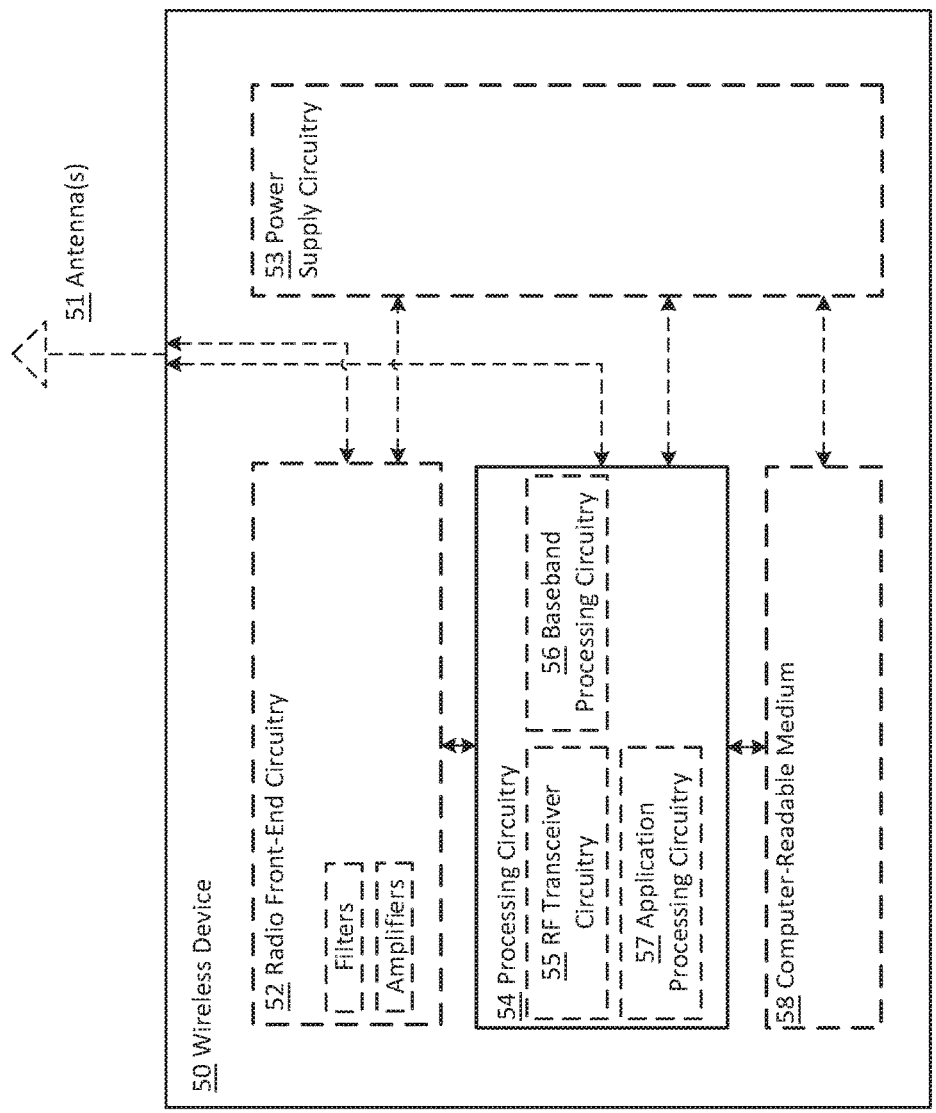
FIG. 4 is a block diagram illustrating an example wireless device.

FIG. 4 illustrates an example wireless device 50, which may, according to various embodiments, carry out one or more of the methods described above, such as those discussed above in connection with FIG. 2. Wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc. It will be appreciated that the wireless device 50 shown in FIG. 4 is but an example; other embodiments may include any suitable combination of hardware and/or software adapted to carry out one or more of the techniques described herein.

As shown in FIG. 4, example wireless device 50 includes an antenna 51, radio front-end circuitry 52, processing circuitry 54, and a computer-readable storage medium 58. Antenna 51 may include one or more antennas or antenna arrays, and is configured to send and/or receive wireless signals, and is connected to radio front-end circuitry 52. In certain alternative embodiments, wireless device 50 may not include antenna 51, and antenna 51 may instead be separate from wireless device 50 and be connectable to wireless device 50 through an interface or port.

The radio front-end circuitry 52 may comprise various filters and amplifiers, is connected to antenna 51 and processing circuitry 54, and is configured to condition signals communicated between antenna 51 and processing circuitry 54. In certain alternative embodiments, wireless device 50 may not include radio front-end circuitry 52, and processing circuitry 54 may instead be connected to antenna 51 without radio front-end circuitry 52.

Processing circuitry 54 may include one or more of radio frequency (RF) transceiver circuitry 55, baseband processing circuitry 56, and application processing circuitry 57. In some embodiments, the RF transceiver circuitry 55, baseband processing circuitry 56, and application processing circuitry 57 may be on separate chipsets. In alternative embodiments, part or all of the baseband processing circuitry 56 and application processing circuitry 57 may be combined into one chipset, and the RF transceiver circuitry 55 may be on a separate chipset. In still alternative embodiments, part or all of the RF transceiver circuitry 55 and baseband processing circuitry 56 may be on the same chipset, and the application processing circuitry 57 may be on a separate chipset. In yet other alternative embodiments, part or all of the RF transceiver circuitry 55, baseband processing circuitry 56, and application processing circuitry 57 may be combined in the same chipset. Processing circuitry 54 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 54 executing instructions stored on a computer-readable storage medium 58, as shown in FIG. 4. In alternative embodiments, some or all of the functionality may be provided by the processing circuitry 54 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 54 alone or to other components of the wireless device, but are enjoyed by the wireless device as a whole, and/or by end users and the wireless network generally.

Antenna 51, radio front-end circuitry 52, and/or processing circuitry 54 may be configured to perform any receiving operations described herein as being performed by a wireless device. Any information, data and/or signals may be received from a network equipment and/or another wireless device.

The processing circuitry 54 may be configured to perform any determining operations described herein as being performed by a wireless device. Determining as performed by processing circuitry 54 may include processing information obtained by the processing circuitry 54 by, for example, converting the obtained information into other information, comparing the obtained information or converted information to information stored in the wireless device, and/or performing one or more operations based on the obtained information or converted information, and as a result of said processing making a determination.

Antenna 51, radio front-end circuitry 52, and/or processing circuitry 54 may be configured to perform any transmitting operations described herein as being performed by a wireless device. Any information, data and/or signals may be transmitted to a network equipment and/or another wireless device. It will be appreciated that when processing circuitry 54 or similar circuitry is referred to as "transmitting" or "receiving" certain information, the context may indicate that this transmitting or receiving is done with the use of an antenna and radio front-end circuitry, where, in some cases, certain operations of the radio front-end circuitry and/or selection of antennas may be under the control of the processing circuitry.

Computer-readable storage medium 58 is generally operable to store instructions, such as a computer program, software, an application including one or more of logic, rules, code, tables, etc. and/or other instructions capable of being executed by a processor. Examples of computer-readable storage medium 58 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 54. In some embodiments, processing circuitry 54 and computer-readable storage medium 58 may be considered to be integrated.

Alternative embodiments of the wireless device 50 may include additional components beyond those shown in FIG. 4 that may be responsible for providing certain aspects of the wireless device's functionality, including any of the functionality described herein and/or any functionality necessary to support the solution described above. As just one example, wireless device 50 may include input interfaces, devices and circuits, and output interfaces, devices and circuits. Input interfaces, devices, and circuits are configured to allow input of information into wireless device 50, and are connected to processing circuitry 54 to allow processing circuitry 54 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from wireless device 50, and are connected to processing circuitry 54 to allow processing circuitry 54 to output information from wireless device 50. For example, output interfaces, devices, or circuits may include a speaker, a display, vibrating circuitry, a USB port, a headphone interface, or other output elements. Using one or more input and output interfaces, devices, and circuits, wireless device 50 may communicate with end users and/or the wireless network, and allow them to benefit from the functionality described herein.

As another example, wireless device 50 may include power supply circuitry 53. The power supply circuitry 53 may comprise power management circuitry. The power supply circuitry may receive power from a power source, which may either be comprised in, or be external to, power supply circuitry 53. For example, wireless device 50 may comprise a power source in the form of a battery or battery pack which is connected to, or integrated in, power supply circuitry 53. Other types of power sources, such as photovoltaic devices, may also be used. As a further example, wireless device 50 may be connectable to an external power source (such as an electricity outlet) via an input circuitry or interface such as an electrical cable, whereby the external power source supplies power to power supply circuitry 53.

Power supply circuitry 53 may be connected to radio front-end circuitry 52, processing circuitry 54, and/or computer-readable storage medium 58, and be configured to supply wireless device 50, including processing circuitry 54, with power for performing the functionality described herein.

Wireless device 50 may also include multiple sets of processing circuitry 54, computer-readable storage medium 58, radio front-end circuitry 52, and/or antenna 51 for different wireless technologies integrated into wireless device 50, such as, for example, GSM, WCDMA, LTE, NR, WiFi, or Bluetooth wireless technologies. These wireless technologies may be integrated into the same or different chipsets and other components within wireless device 50.

The wireless device 50 is configured to communicate with a radio node or base station in a wide-area cellular network via antenna 51 and radio front-end circuitry 52, e.g., using RF transceiver circuitry 55 in processing circuitry 54. The RF transceiver circuitry 55 and radio front-end circuitry 52 may include transmitter circuits, receiver circuits, and associated control circuits that are collectively configured to transmit and receive signals according to one or more radio access technologies, for the purposes of using cellular communication services. This radio access technology may be the 5$^{th}$-generation NR radio access technology, for example, or LTE radio access technology.

In some embodiments wireless device 50 is adapted/configured, e.g., with appropriate program instructions executing on processing circuitry 54, to receive, from the wireless network, configuration information instructing the wireless device to perform measurements on one or more radio resources or signals, the one or more radio resources or signals being solely associated with one or more wireless services that the wireless device is at least currently unable to use, to perform one or more measurements on the radio resources or signals, in accordance with the received configuration information, and to selectively report results of the measurements, based on the configuration information. The one or more wireless services that the wireless device 50 is at least currently unable to use comprises a service may have at least one of the following, in some embodiments: one or more higher reliability requirements than corresponding reliability requirements for a generic data service also provided by the wireless network; one or more higher availability requirements than corresponding availability requirements for a generic data service also provided by the wireless network; and one or more lower latency requirements than corresponding latency requirements for a generic data service also provided by the wireless network.

In some embodiments, the wireless device 50 is at least currently unable to use the one or more wireless services because of at least one of the following: the wireless device 50 is physically incapable of using at least one of the one or more wireless services; the wireless device 50 is not equipped with one or more software or firmware components needed to carry out at least one of the more wireless services; the wireless device 50 is not configured with parameters necessary for using at least one of the one or more wireless services; at least one of the one or more wireless services is not activated on the wireless device 50.

In some embodiments, wireless device 50 is adapted to perform a signal-to-noise ratio (SNR) or signal-to-interference-plus-noise (SNR) measurement, and to report a result of the SNR or SINR measurement in response to the SNR or SINR measurement being lower than a threshold value. In some embodiments, the wireless device 50 is further adapted to determine that a signal is not detected, based on performing the one or more measurements, and to report an indication that the signal is not detected.

In some embodiments, the wireless device 50 is adapted to report separate results for each of two or more frequency subbands. In some embodiments, the wireless device 50 is adapted to report positioning information corresponding to the reported results. This positioning information may comprise information received from or derived from received global navigation satellite system (GNSS) signals. The positioning information may instead or additionally comprise one or more of: a serving cell identifier for the wireless device 50; an estimated distance of the wireless device 50 from a transmitter; and identifiers for one or more neighboring cells.

Figure 5:
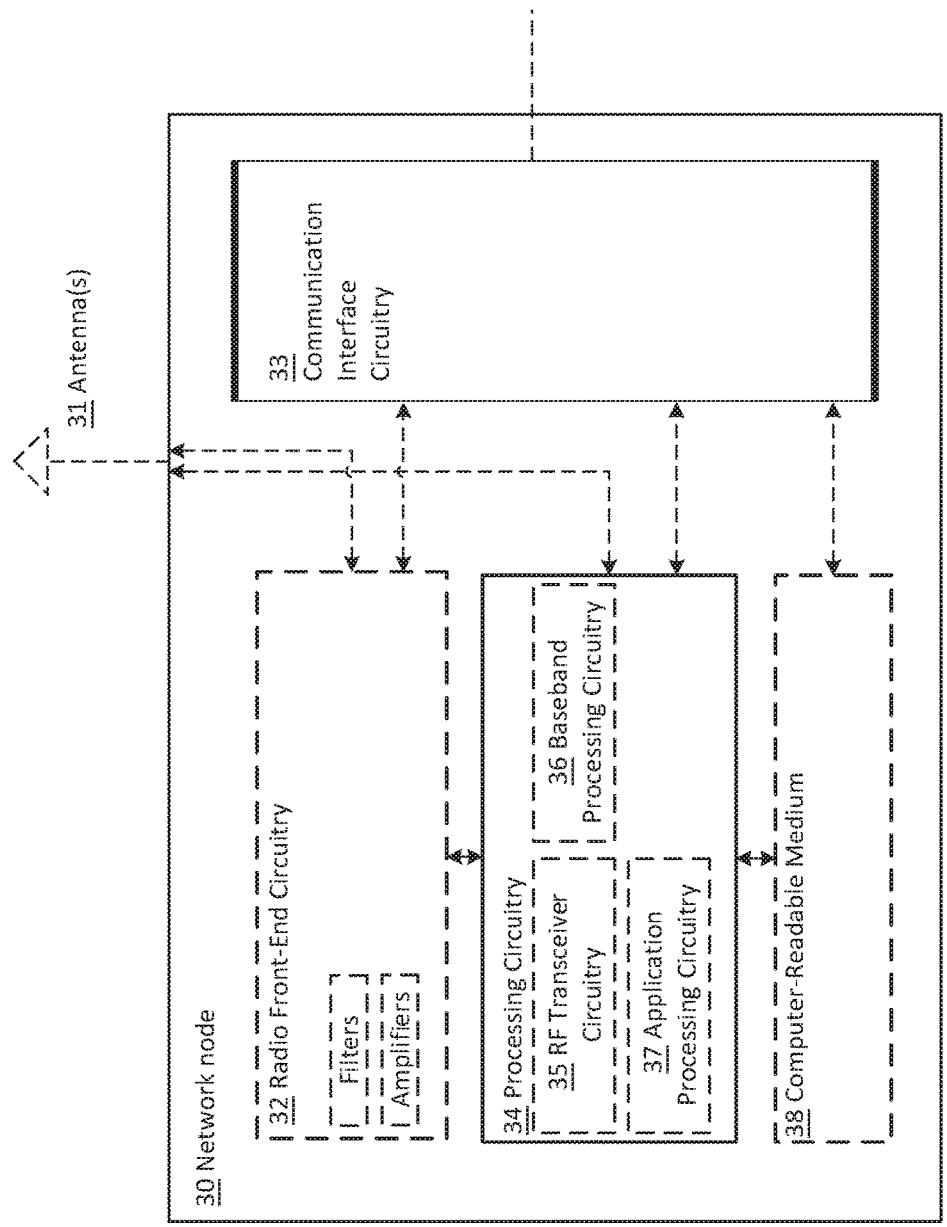
FIG. 5 is a block diagram illustrating an example network node.

FIG. 5 illustrates a diagram of a network node 30 that may be configured to carry out one or more of the techniques described herein, such as any of those discussed above in connection with FIG. 3. The illustrated network node 30 can be any kind of network node that may include a network access node such as a base station, radio base station, base transceiver station, evolved Node B (eNodeB), Node B, relay node. In the non-limiting embodiments described below, the network node 30 will be described as operating as a cellular network access node configured to operate in an NR or LTE network. While network node 30 is illustrated as a radio network node, including antennas 31, radio front-end circuitry 32, and radio-frequency (RF) transceiver circuitry 35 included in processing circuitry 34, it will be appreciated that the techniques described herein may also be implemented in whole or in part on some other node in a radio access network, or in a core network node, or in a server or other node outside of the wireless telecommunications network, in which case the transceiver circuit 36 will not be present. Those skilled in the art will readily appreciate how each type of node may be adapted to carry out one or more of the methods and signaling processes described herein, e.g., through the modification of and/or addition of appropriate program instructions for execution by processing circuits 34.

It will be appreciated that the network node shown in FIG. 5 is but an example; other embodiments may include any suitable combination of hardware and/or software adapted to carry out one or more of the techniques described herein for a network node.

As shown in FIG. 5, example network node 30 includes an antenna 31, radio front-end circuitry 32, processing circuitry 34, and a computer-readable storage medium 38. Antenna 31 may include one or more antennas or antenna arrays, and is configured to send and/or receive wireless signals, and is connected to radio front-end circuitry 32. In certain alternative embodiments, network node 30 may not include antenna 31, and antenna 31 may instead be separate from network node 30 and be connectable to network node 30 through an interface or port.

The radio front-end circuitry 32 may comprise various filters and amplifiers, is connected to antenna 31 and processing circuitry 34, and is configured to condition signals communicated between antenna 31 and processing circuitry 34. In certain alternative embodiments, network node 30 may not include radio front-end circuitry 32, and processing circuitry 34 may instead be connected to antenna 31 without radio front-end circuitry 32.

Processing circuitry 34 may include one or more of radio frequency (RF) transceiver circuitry 35, baseband processing circuitry 36, and application processing circuitry 37. In some embodiments, the RF transceiver circuitry 35, baseband processing circuitry 36, and application processing circuitry 37 may be on separate chipsets. In alternative embodiments, part or all of the baseband processing circuitry 36 and application processing circuitry 37 may be combined into one chipset, and the RF transceiver circuitry 35 may be on a separate chipset. In still alternative embodiments, part or all of the RF transceiver circuitry 35 and baseband processing circuitry 36 may be on the same chipset, and the application processing circuitry 37 may be on a separate chipset. In yet other alternative embodiments, part or all of the RF transceiver circuitry 35, baseband processing circuitry 36, and application processing circuitry 37 may be combined in the same chipset. Processing circuitry 34 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a network node may be provided by the processing circuitry 34 executing instructions stored on a computer-readable storage medium 38, as shown in FIG. 5. In alternative embodiments, some or all of the functionality may be provided by the processing circuitry 34 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 34 alone or to other components of the network node, but are enjoyed by the network node as a whole, and/or by the wireless network generally.

Antenna 31, radio front-end circuitry 32, and/or processing circuitry 34 may be configured to perform any receiving operations described herein as being performed by a network node. Any information, data and/or signals may be received from wireless devices, e.g., via radio front-end circuitry 32 and antenna(s) 31, and/or from other network nodes, e.g., via communication interface circuitry 33, which may be configured for communication over a backhaul communication link, for example.

The processing circuitry 34 may be configured to perform any determining operations described herein as being performed by a network node. Determining as performed by processing circuitry 34 may include processing information obtained by the processing circuitry 34 by, for example, converting the obtained information into other information, comparing the obtained information or converted information to information stored in the wireless device, and/or performing one or more operations based on the obtained information or converted information, and as a result of said processing making a determination.

Antenna 31, radio front-end circuitry 32, and/or processing circuitry 34 may be configured to perform any transmitting operations described herein as being performed by a network node. Any information, data and/or signals may be transmitted to one or more wireless devices, e.g., via radio front-end circuitry 32 and antenna(s) 31, and/or to other network nodes, e.g., via communication interface circuitry 33, which may be configured for communication over a backhaul communication link, for example. It will be appreciated that when processing circuitry 34 or similar circuitry is referred to as "transmitting" or "receiving" certain information, the context may indicate that this transmitting or receiving is done with the use of an antenna and radio front-end circuitry, where, in some cases, certain operations of the radio front-end circuitry and/or selection of antennas may be under the control of the processing circuitry.

Computer-readable storage medium 38 is generally operable to store instructions, such as a computer program, software, an application including one or more of logic, rules, code, tables, etc. and/or other instructions capable of being executed by a processor. Examples of computer-readable storage medium 38 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 34. In some embodiments, processing circuitry 34 and computer-readable storage medium 38 may be considered to be integrated.

Alternative embodiments of the network node 30 may include additional components beyond those shown in FIG. 5 that may be responsible for providing certain aspects of the wireless device's functionality, including any of the functionality described herein and/or any functionality necessary to support the solution described above. As another example, network node 30 may include appropriate power supply circuitry (not pictured), which may in turn comprise power management circuitry. The power supply circuitry may receive power from a power source, which may either be comprised in, or be external to, the power supply circuitry. Network node 30 may be connectable to an external power source (such as an electricity outlet) via an input circuitry or interface such as an electrical cable, whereby the external power source supplies power to the node's power supply circuitry.

The node's power supply circuitry may be connected to radio front-end circuitry 32, processing circuitry 34, and/or computer-readable storage medium 38, and be configured to supply network node 30, including processing circuitry 34, with power for performing the functionality described herein.

Network node 30 may also include multiple sets of processing circuitry 34, computer-readable storage medium 38, radio front-end circuitry 32, and/or antenna 31 for different wireless technologies integrated into network node 30, such as, for example, GSM, WCDMA, LTE, NR, WiFi, or Bluetooth wireless technologies. These wireless technologies may be integrated into the same or different chipsets and other components within network node 30.

The network node 30, in some embodiments, facilitates communication between wireless terminals, other network access nodes and/or the core network. The network node 30 may include a communication interface circuit 38 that includes circuitry for communicating with other nodes in the core network, radio nodes, and/or other types of nodes in the network for the purposes of providing data and/or cellular communication services. The illustrated network node 30 communicates with wireless devices using antennas 31, radio front-end circuitry 32, and a RF transceiver circuitry 34. The radio front-end circuitry 32, and a RF transceiver circuitry 34 may include transmitter circuits, receiver circuits, and associated control circuits that are collectively configured to transmit and receive signals according to a radio access technology, for the purposes of providing cellular communication services. The communication interface circuit 33 is configured to communicate with the cellular network using signals and/or interfaces that are set up for the cellular network.

According to some embodiments, the network node 30 is adapted/configured, e.g., with appropriate program instructions executing on processing circuitry 34, to carry out one or more of the methods described above, such as those discussed in connection with FIG. 3. Thus, in some embodiments network node 30 is adapted to operate in or associated with a wireless network providing a critical wireless service, in addition to one or more other wireless services, and is further adapted to: receive, from one or more wireless devices at least currently unable to use the critical wireless service, results of measurements performed on one or more radio resources or signals associated with the critical service; and take at least one action to adjust operation or delivery of the critical wireless service, based on the received results of measurements.

In some embodiments, the critical wireless service has at least one of the following: one or more higher reliability requirements than corresponding reliability requirements for a generic data service also provided by the wireless network; one or more higher availability requirements than corresponding availability requirements for a generic data service also provided by the wireless network; and one or more lower latency requirements than corresponding latency requirements for a generic data service also provided by the wireless network. In some embodiments, the one or more wireless device are at least currently unable to use the critical wireless service because of at least one of the following: one or more of the wireless device is physically incapable of using the critical wireless service; one or more of the wireless device is not equipped with one or more software or firmware components needed to carry out the critical wireless service; one or more of the wireless device is not configured with parameters necessary for using the critical wireless service; and the critical wireless service is not activated on one or more of the wireless device.

In some embodiments, network node 30 is adapted to schedule transmissions related to the critical wireless service, based on the received results of measurements. The received results of measurements may comprise separate results for each of two or more frequency subbands, in some embodiments, and the network node 30 is adapted to schedule transmissions related to the critical wireless service by selecting a frequency subband for scheduling a transmission related to the critical wireless service, based on the separate results for each of two or more frequency subbands.

In some embodiments, the network node 30 is adapted to adjust a power of at least one transmission related to the critical wireless service, based on the received results of measurements. The received results of measurements may comprise positioning information for the corresponding measurements, and the network node is adapted to adjust operation or delivery of the critical wireless service based on the positioning information. In some embodiments, the network node is further adapted to send, to one or more wireless devices, configuration information instructing the wireless devices to perform measurements on the one or more radio resources or signals.

As discussed in detail above, the techniques described herein, e.g., as illustrated in the process flow diagrams of FIGS. 2 and 3, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 6:
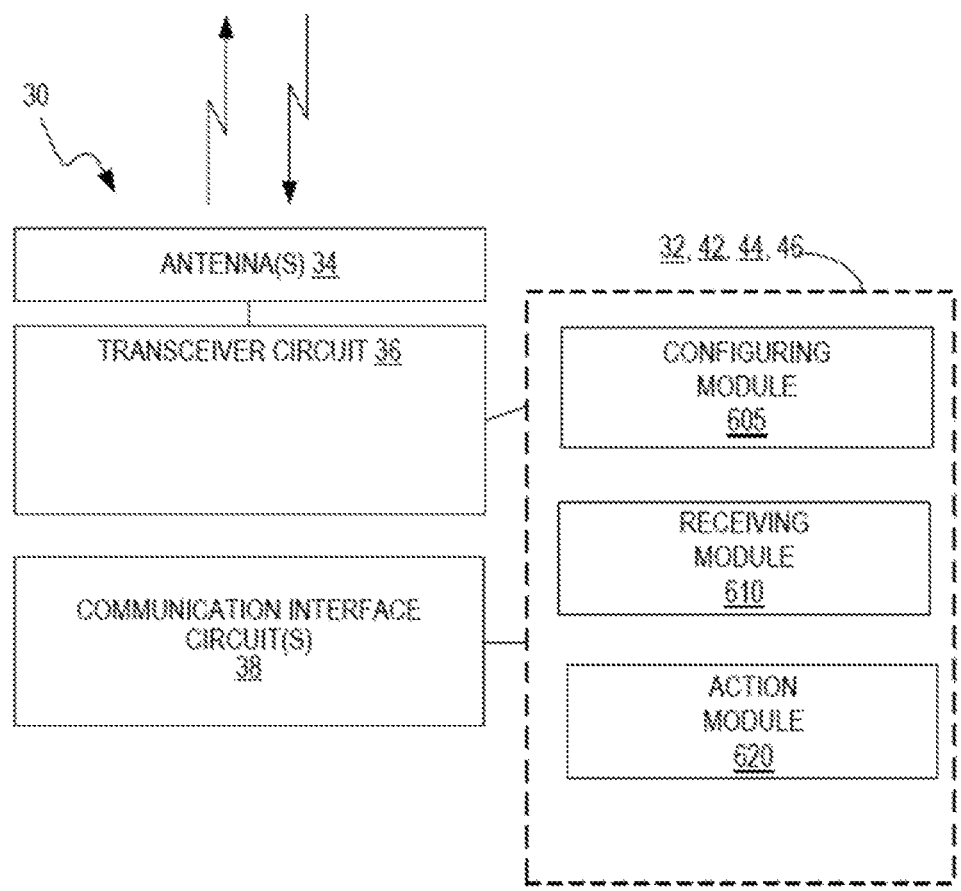
FIG. 6 illustrates a functional representation of an example network node.

FIG. 6 illustrates an example functional module or circuit architecture as may be implemented in one or more nodes adapted for operation in or associated with a wireless network providing a critical wireless service, in addition to one or more other wireless services, such as in network node 30. The functional implementation includes a receiving module 610 for receiving, from one or more wireless devices that are at least currently unable to use the critical wireless service, results of measurements performed on one or more radio resources or signals associated with the critical service. The functional implementation further includes an action module 620 for taking at least one action to adjust operation or delivery of the critical wireless service, based on the received results of measurements. In some embodiments, the functional implementation may further include a configuration module 605, for sending, to one or more wireless devices, configuration information instructing the wireless devices to perform measurements on the one or more radio resources or signals. The several variations discussed above in connection with FIG. 5 apply also to the implementation shown in FIG. 6.

Figure 7:
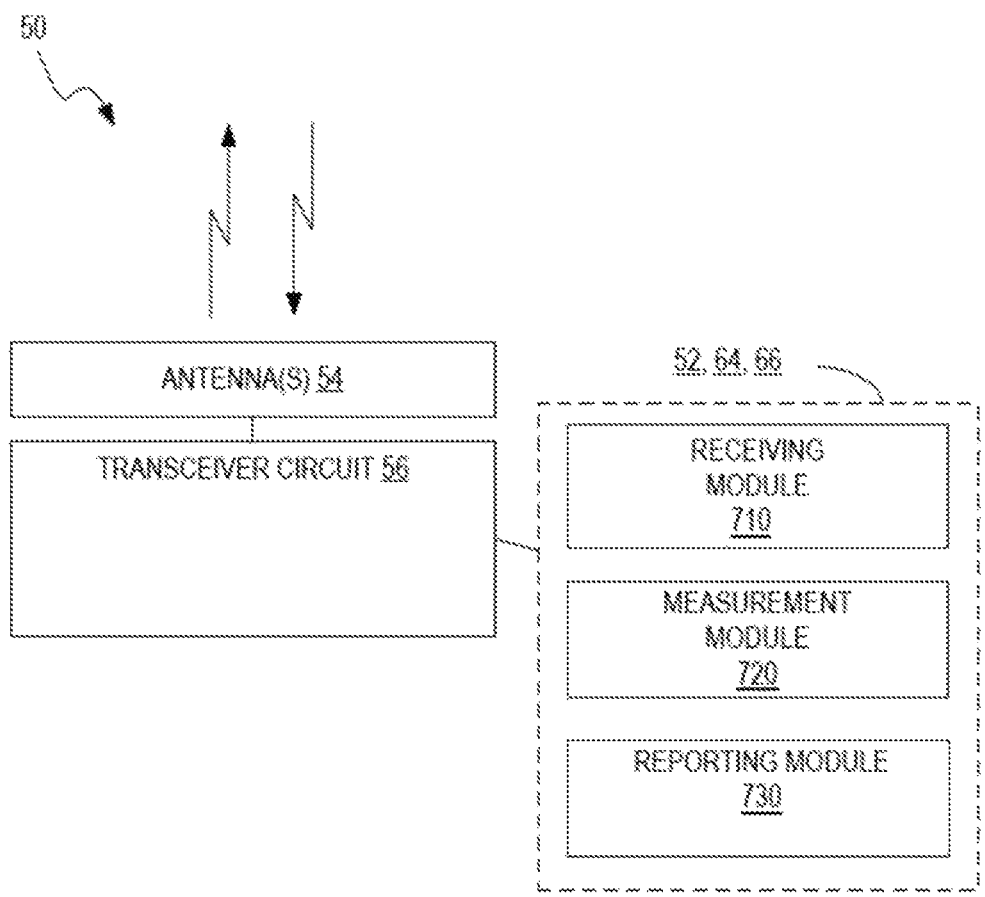
FIG. 7 illustrates a functional representation of a wireless device.

Similarly, FIG. 7 illustrates an example functional module or circuit architecture as may be implemented in a wireless device 50 adapted for operation in a wireless communication network. The implementation includes a receiving module 710 for receiving, from the wireless network, configuration information instructing the wireless device to perform measurements on one or more radio resources or signals, the one or more radio resources or signals being solely associated with one or more wireless services that the wireless device is at least currently unable to use. The implementation further includes a measurement module 720 for performing one or more measurements on the radio resources or signals, in accordance with the received configuration information, and a reporting module 730 for selectively reporting results of the measurements, based on the configuration information.

Notably, modifications and other embodiments of the disclosed inventions) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a wireless device operating in a wireless network, for reporting measurements of interference affecting a wireless service provided by the wireless network, the method comprising:
   receiving, from the wireless network, configuration information instructing the wireless device to perform measurements on one or more radio resources or signals, the one or more radio resources or signals being solely associated with one or more wireless services that the wireless device is at least currently unable to use;
   performing one or more measurements on the radio resources or signals, in accordance with the received configuration information; and
   selectively reporting results of the measurements, based on the configuration information;
wherein the wireless device is at least currently unable to use the one or more wireless services because of at least one of the following:
   the wireless device is physically incapable of using at least one of the one or more wireless services;
   the wireless device is not equipped with one or more software or firmware components needed to carry out at least one of the more wireless services;
   at least one of the one or more wireless services is not activated on the wireless device.

2. The method of claim 1, wherein the one or more wireless services that the wireless device is at least currently unable to use comprises a service having at least one of the following:
   one or more higher reliability requirements than corresponding reliability requirements for a generic data service also provided by the wireless network;
   one or more higher availability requirements than corresponding availability requirements for a generic data service also provided by the wireless network; and
   one or more lower latency requirements than corresponding latency requirements for a generic data service also provided by the wireless network.

3. The method of claim 1, wherein performing one or more measurements on the radio resources or signals comprises performing a signal-to-noise ratio (SNR) or signalto-interference-plus-noise (SINR) measurement, and wherein selectively reporting results of the measurements comprises reporting a result of the SNR or SINR measurement in response to the SNR or SINR measurement being lower than a threshold value.

4. The method of claim 1, wherein the method further comprises determining that a signal is not detected, based on performing the one or more measurements, and wherein selectively reporting results of the measurements comprises reporting an indication that the signal is not detected.

5. The method of claim 1, wherein selectively reporting results of the measurements comprises reporting separate results for each of two or more frequency subbands.

6. The method of claim 1, wherein selectively reporting results of the measurements comprises reporting positioning information corresponding to the reported results.

7. The method of claim 6, wherein the positioning information comprises information received from or derived from received global navigation satellite system (GNSS) signals.

8. The method of claim 6, wherein the positioning information comprises one or more of:
a serving cell identifier for the wireless device;
an estimated distance of the wireless device from a transmitter; and
identifiers for one or more neighboring cells.

9. A method, in one or more nodes operating in or associated with a wireless network providing a critical wireless service, in addition to one or more other wireless services, the method comprising:
receiving, from one or more wireless devices at least currently unable to use the critical wireless service, results of measurements performed on one or more radio resources or signals associated with the critical service; and
taking at least one action to adjust operation or delivery of the critical wireless service, based on the received results of measurements;
wherein each of the one or more wireless devices is at least currently unable to use the one or more wireless services because of at least one of the following:
the wireless device is physically incapable of using at least one of the one or more wireless services;
the wireless device is not equipped with one or more software or firmware components needed to carry out at least one of the more wireless services;
at least one of the one or more wireless services is not activated on the wireless device.

10. The method of claim 9, wherein the critical wireless service is characterized by at least one of the following:
one or more higher reliability requirements than corresponding reliability requirements for a generic data service also provided by the wireless network;
one or more higher availability requirements than corresponding availability requirements for a generic data service also provided by the wireless network; and
one or more lower latency requirements than corresponding latency requirements for a generic data service also provided by the wireless network.

11. The method of claim 9, wherein taking at least one action comprises scheduling transmissions related to the critical wireless service, based on the received results of measurements.

12. The method of claim 11, wherein the received results of measurements comprise separate results for each of two or more frequency subbands, and wherein said scheduling of transmissions related to the critical wireless service comprises selecting a frequency subband for scheduling a transmission related to the critical wireless service, based on the separate results for each of two or more frequency subbands.

13. The method of claim 9, wherein taking at least one action comprises adjusting a power of at least one transmission related to the critical wireless service, based on the received results of measurements.

14. The method of claim 9, wherein the received results of measurements comprise positioning information for the corresponding measurements, and wherein said taking at least one action to adjust operation or delivery of the critical wireless service is based on the positioning information.

15. The method of claim 9, further comprising sending, to one or more wireless devices, configuration information instructing the wireless devices to perform measurements on the one or more radio resources or signals.

16. A wireless device adapted for operation in a wireless network, the wireless device comprising:
a transceiver circuit configured to receive, from the wireless network, configuration information instructing the wireless device to perform measurements on one or more radio resources or signals, the one or more radio resources or signals being solely associated with one or more wireless services that the wireless device is at least currently unable to use; and
a processing circuit configured to perform one or more measurements on the radio resources or signals, in accordance with the received configuration information, and selectively report results of the measurements, based on the configuration information;
wherein the wireless device is at least currently unable to use the one or more wireless services because of at least one of the following:
the wireless device is physically incapable of using at least one of the one or more wireless services;
the wireless device is not equipped with one or more software or firmware components needed to carry out at least one of the more wireless services;
at least one of the one or more wireless services is not activated on the wireless device.

17. The wireless device of claim 16, wherein the one or more wireless services that the wireless device is at least currently unable to use comprises a service having at least one of the following:
one or more higher reliability requirements than corresponding reliability requirements for a generic data service also provided by the wireless network;
one or more higher availability requirements than corresponding availability requirements for a generic data service also provided by the wireless network; and
one or more lower latency requirements than corresponding latency requirements for a generic data service also provided by the wireless network.

18. The wireless device of claim 16, wherein the processing circuit is configured to perform a signal-to-noise ratio (SNR) or signal-to-interference-plus-noise (SINR) measurement, and to report a result of the SNR or SINR measurement in response to the SNR or SINR measurement being lower than a threshold value.

19. The wireless device of claim 16, wherein the processing circuit is further configured to determine that a signal is not detected, based on performing the one or more measurements, and to report an indication that the signal is not detected.

20. The wireless device of claim 16, wherein the processing circuit is configured to report separate results for each of two or more frequency subbands.

21. The wireless device of claim 16, wherein the processing circuit is configured to report positioning information corresponding to the reported results.

22. The wireless device of claim 21, wherein the positioning information comprises information received from or derived from received global navigation satellite system (GNSS) signals.

23. The wireless device of claim 21, wherein the positioning information comprises one or more of:
   a serving cell identifier for the wireless device;
   an estimated distance of the wireless device from a transmitter; and
   identifiers for one or more neighboring cells.

24. The wireless device of claim 16, wherein the wireless device is a user equipment (UE).

25. A node adapted for operation in or associated with a wireless network providing a critical wireless service, in addition to one or more other wireless services, the node comprising:
   a transceiver circuit or other communications interface circuit configured to receive, from one or more wireless devices at least currently unable to use the critical wireless service, results of measurements performed on one or more radio resources or signals associated with the critical service; and
   a processing circuit configured to take at least one action to adjust operation or delivery of the critical wireless service, based on the received results of measurements;
wherein each of the one or more wireless devices is at least currently unable to use the one or more wireless services because of at least one of the following:
   the wireless device is physically incapable of using at least one of the one or more wireless services;
   the wireless device is not equipped with one or more software or firmware components needed to carry out at least one of the more wireless services;
   at least one of the one or more wireless services is not activated on the wireless device.

26. The node of claim 25, wherein the critical wireless service has at least one of the following:
   one or more higher reliability requirements than corresponding reliability requirements for a generic data service also provided by the wireless network;
   one or more higher availability requirements than corresponding availability requirements for a generic data service also provided by the wireless network; and
   one or more lower latency requirements than corresponding latency requirements for a generic data service also provided by the wireless network.

27. The node of claim 25, wherein the processing circuit is configured to schedule transmissions related to the critical wireless service, based on the received results of measurements.

28. The node of claim 27, wherein the received results of measurements comprise separate results for each of two or more frequency subbands, and wherein the processing circuit is configured to schedule transmissions related to the critical wireless service by selecting a frequency subband for scheduling a transmission related to the critical wireless service, based on the separate results for each of two or more frequency subbands.

29. The node of claim 25, wherein the processing circuit is configured to adjust a power of at least one transmission related to the critical wireless service, based on the received results of measurements.

30. The node of claim 25, wherein the received results of measurements comprise positioning information for the corresponding measurements, and wherein the processing circuit is configured to adjust operation or delivery of the critical wireless service based on the positioning information.

31. The node of claim 25, wherein the processing circuit is configured to send, to one or more wireless devices, configuration information instructing the wireless devices to perform measurements on the one or more radio resources or signals.

32. A non-transitory computer-readable medium comprising, stored thereupon, program instructions for execution by a processing circuit of a wireless device operating in a wireless network, the program instructions being configured to cause the wireless device to:
   receive, from the wireless network, configuration information instructing the wireless device to perform measurements on one or more radio resources or signals, the one or more radio resources or signals being solely associated with one or more wireless services that the wireless device is at least currently unable to use;
   perform one or more measurements on the radio resources or signals, in accordance with the received configuration information; and
   selectively report results of the measurements, based on the configuration information;
wherein the wireless device is at least currently unable to use the one or more wireless services because of at least one of the following:
   the wireless device is physically incapable of using at least one of the one or more wireless services;
   the wireless device is not equipped with one or more software or firmware components needed to carry out at least one of the more wireless services;
   at least one of the one or more wireless services is not activated on the wireless device.

33. A non-transitory computer-readable medium comprising, stored thereupon, program instructions for execution by a processing circuit of a node operating in or associated with a wireless network providing a critical wireless service, in addition to one or more other wireless services, the program instructions being configured to cause the node to:
   receive, from one or more wireless devices at least currently unable to use the critical wireless service, results of measurements performed on one or more radio resources or signals associated with the critical service; and
   take at least one action to adjust operation or delivery of the critical wireless service, based on the received results of measurements;
wherein each of the one or more wireless devices is at least currently unable to use the one or more wireless services because of at least one of the following:
   the wireless device is physically incapable of using at least one of the one or more wireless services;
   the wireless device is not equipped with one or more software or firmware components needed to carry out at least one of the more wireless services;
   at least one of the one or more wireless services is not activated on the wireless device.

34. A method, in a wireless device operating in a wireless network, for reporting measurements of interference affecting a wireless service provided by the wireless network, the method comprising:
   receiving, from the wireless network, configuration information instructing the wireless device to perform measurements on one or more radio resources or signals, the one or more radio resources or signals being solely associated with one or more wireless services that the wireless device is at least currently unable to use;

performing one or more measurements on the radio resources or signals, in accordance with the received configuration information; and selectively reporting results of the measurements, based on the configuration information;

wherein the one or more wireless services that the wireless device is at least currently unable to use comprises a service having at least one of the following:

one or more higher reliability requirements than corresponding reliability requirements for a generic data service also provided by the wireless network;

one or more higher availability requirements than corresponding availability requirements for a generic data service also provided by the wireless network; and one or more lower latency requirements than corresponding latency requirements for a generic data service also provided by the wireless network.

35. A method, in one or more nodes operating in or associated with a wireless network providing a critical wireless service, in addition to one or more other wireless services, the method comprising:

receiving, from one or more wireless devices at least currently unable to use the critical wireless service, results of measurements performed on one or more radio resources or signals associated with the critical service; and taking at least one action to adjust operation or delivery of the critical wireless service, based on the received results of measurements;

wherein the critical wireless service is characterized by at least one of the following:

one or more higher reliability requirements than corresponding reliability requirements for a generic data service also provided by the wireless network;

one or more higher availability requirements than corresponding availability requirements for a generic data service also provided by the wireless network; and one or more lower latency requirements than corresponding latency requirements for a generic data service also provided by the wireless network.

* * * * *